United States Patent [19]

Dang et al.

[11] Patent Number: 4,765,530

[45] Date of Patent: Aug. 23, 1988

[54] METHOD FOR FORMING A TITANIUM LINED ELECTROCHEMICAL CELL

[75] Inventors: Hiep D. Dang, Lake Jackson; Richard N. Beaver, Angleton, both of Tex.

[73] Assignee: The Dow Chemical Company, Midland, Mich.

[21] Appl. No.: 13,852

[22] Filed: Feb. 12, 1987

Related U.S. Application Data

[63] Continuation of Ser. No. 901,923, Aug. 29, 1986, abandoned, which is a continuation of Ser. No. 682,740, Dec. 17, 1984, abandoned.

[51] Int. Cl.$^4$ .............................................. B23K 9/225
[52] U.S. Cl. ................................... 228/175; 228/189; 228/263.16; 228/263.21; 228/185
[58] Field of Search ............... 228/107, 175, 189, 184, 228/263.16, 263.21, 185

[56] References Cited

U.S. PATENT DOCUMENTS

| | | | |
|---|---|---|---|
| 2,985,955 | 5/1961 | Rostoker | 228/175 |
| 3,798,010 | 3/1974 | Sharp | 428/940 X |
| 3,798,011 | 3/1974 | Sharp | 428/940 X |
| 4,023,936 | 5/1977 | Morse et al. | 428/679 |
| 4,059,216 | 11/1977 | Meyer | 228/179 |
| 4,247,376 | 1/1981 | Dempsey et al. | 204/128 |
| 4,294,671 | 10/1981 | Balko | 204/128 |
| 4,337,300 | 6/1982 | Itaba et al. | 428/627 |
| 4,411,962 | 10/1983 | Johnson | 428/615 |
| 4,488,946 | 12/1984 | Morris et al. | 204/98 |
| 4,612,259 | 9/1986 | Ueda | 428/940 X |

FOREIGN PATENT DOCUMENTS

| | | | |
|---|---|---|---|
| 60083 | 9/1982 | European Pat. Off. | 228/190 |
| 41688 | 3/1983 | Japan | 228/107 |

OTHER PUBLICATIONS

Michell and Kessler, "The Welding of Titanium to Steel", *Welding Journal*, Dec. 1961.

*Primary Examiner*—Kenneth J. Ramsey

[57] ABSTRACT

The invention is a method comprising:
welding a titanium sheet having a thickness of less than about 2 millimeters to a ferrous material through a weldably compatible intermediate material and a titanium intermediate.

5 Claims, No Drawings

METHOD FOR FORMING A TITANIUM LINED ELECTROCHEMICAL CELL

CROSS REFERENCE TO RELATED APPLICATIONS

This is a continuation of application Ser. No. 901,923 filed Aug. 29, 1986, now abandoned which is a continuation of application Ser. No. 682,740, filed Dec. 17, 1984 now abandoned.

The invention is a method for joining titanium to a ferrous metal and specifically a method for joining an electrochemical cell liner to a ferrous metal backboard.

BACKGROUND OF THE INVENTION

Titanium and ferrous metals cannot easily be joined directly to each other by welding, because the resulting titanium/ferrous metal mixture, or alloy, is extremely brittle and usually will not survive the shrinkage stresses imposed upon it during cooling from the welding temperature.

To weld titanium to ferrous metal, an intermediate metal, which is compatible with both the ferrous metal and the titanium, is positioned between, and welded to, each of the two metals. The intermediate metal forms an alloy with the titanium and with the ferrous metal, thus joining the titanium to the ferrous metal.

Among the metals known to be compatible with titanium and ferrous metal is vanadium. An excellent discussion concerning the welding of ferrous metal to titanium using vanadium can be found in "The Welding of Titanium to Steel", *Welding Journal* (December 1961), D. R. Mitchell and H. D. Kessler.

Titanium is commonly used to line various containers. However, since titanium is much more expensive than various other materials, such as steel or other ferrous metals, the titanium liners are made as thin as is absolutely necessary to conserve material. Frequently, such thin layers of titanium develop leaks much faster and easier than would a thicker titanium. This problem is especially severe at points where titanium has been welded to a ferrous material through a vanadium intermediate due to alloying of the thin layer of titanium during welding, leaving little sound protective material against corrosive environment.

One reasonable means to follow to weld titanium to a ferrous material is to use a thicker sheet of titanium. This, however, is wasteful because the extra thickness is needed only at the point of welding, and is not needed throughout the entire body. Additionally, if the titanium sheet is to be formed into shapes, for example elongated ribs or vanes, it is very difficult to form thicker sheets of titanium, without cracking the titanium. In addition, thicker sheets of titanium require higher welding current and longer welding times and, therefore, generate more heat. The extra heat tends to crack or deform the titanium sheet. It has also been found that thicker titanium sheets do not bond well.

It would be highly desirable to have a method to weld a very thin sheet of titanium to a ferrous material using an intermediate metal, yet avoiding the problem with leaks caused by the weld.

The present invention provides such a method.

SUMMARY OF THE INVENTION

The invention is a method comprising:
welding a titanium sheet having a thickness of less than about 2 millimeters to a ferrous material through a weldably compatible intermediate material and a titanium intermediate.

DETAILED DESCRIPTION OF THE INVENTION

The method of the present invention allows thin sheets of titanium to be welded to ferrous materials without having to be concerned about leaks or cracks caused by the welding. Without the use of the titanium intermediate, along with the weldably compatible intermediate material, one would have to use a thicker titanium pan to protect against welding leaks. Having to use a thicker titanium pan, solely to minimize leaks caused by welding, is wasteful. The present invention eliminates that necessity.

There are two different welding means commonly used to weld titanium to ferrous metal, i.e. resistance welding and capacitor discharge welding. However, for welding thin sheets of titanium to ferrous metal, capacitor discharge welding is preferred because it does not generate as much heat as resistance welding.

Using the method of the present invention, titanium sheets as thin as about 0.5 millimeters (0.02 inch) may easily be welded to ferrous materials. Preferably, however, the titanium sheet has a thickness less than about 2 millimeters (0.08 inch) to assure good bonding.

The ferrous materials referred to in the present invention are selected from the group consisting of iron, cast iron, ductile iron, steel, and stainless steel.

Known weldably compatible intermediate materials useful for welding titanium to a ferrous material include vanadium and nickel. Any weldably compatible intermediate material will work.

Suitable thicknesses for the intermediate material has found to be from about 0.05 millimeters (0.002 inch) to about 0.50 millimeters (0.020 inch). The weldably compatible intermediate material is preferably at least about 0.25 millimeters (0.010 inch) and is more preferably at least about 0.13 millimeters (0.005 inch) thick.

The titanium intermediate should be sufficiently thick to minimize the penetration of vanadium through the titanium intermediate. Suitable thicknesses for the titanium intermediate are from about 0.89 millimeters (0.035 inch) to about 1.3 millimeters (0.05 inch), or greater. The titanium intermediate is preferably at least about 0.89 millimeters (0.035 inch) thick. This thickness leaves about 0.10 to 0.30 millimeters (0.004 inch to 0.012 inch) of pure titanium remaining unalloyed with the vanadium.

EXAMPLE

A 122 cm (4 feet) by 305 cm (10 feet), 0.89 mm (0.035 inch) thick hot formed titanium liner having 144 hollow caps was ready to be welded on one side of a 122 cm (4 feet) by 305 cm (10 feet) plastic molded cell frame having 144–2.54 cm (1 inch) steel inserts protruding from the plastic central barrier.

A 0.13 mm (0.005 inch) thick×22 mm (0.875 inch) diameter vanadium wafer was placed on top of each steel insert on one side of the plastic frame. A 0.89 mm (0.035 inch) thick×22 mm (0.875 inch) diameter titanium wafer was placed on top of each vanadium wafer. The titanium wafer was then welded to the end of the steel insert through the intermediate vanadium wafer by using a capacitor discharge welder. After all 144 titanium wafers had been welded, the titanium liner was placed on top of the plastic frame with all 144 hollow caps matching all 144 steel inserts. Then the flat end of each cap on the titanium liner was capacitor discharge welded to the titanium wafer which had been already welded to the steel insert through the vanadium wafer. The pan was then vacuum checked for leaks. The plastic frame having a titanium liner welded to steel inserts on one side through vanadium and titanium intermediate wafers and having a nickel liner welded to steel inserts on the opposing side of the frame without any intermediate material, was used to fabricate a complete flat plate bipolar membrane chlorine cell unit. Four similar cell units were operated successfully for 124 days without any leak due to crack or corrosion of the welds.

We claim:

1. A method for welding a thin titanium sheet to a ferrous substrate comprising sequentially performing the following steps:
   (a) positioning a substantially homogenous vanadium intermediate adjacent to one surface of a ferrous substrate;
   (b) then welding a substantially homogenous titanium intermediate to the vanadium, intermediate, and welding said vanadium intermediate to said ferrous substrate;
   (c) then welding a titanium sheet having a thickness of less than about 2 millimeters to the titanium intermediate.

2. The method of claim 1 wherein the titanium intermediate is less than about 2 millimeters thick.

3. The method of claim 1 wherein the vanadium is less than about 0.5 millimeter thick.

4. The method of claim 1 wherein the ferrous material is selected from the group consisting of iron, cast iron, ductile iron, steel and stainless steel.

5. A method for welding a thin titanium sheet to a ferrous substrate comprising sequentially performing the following steps:
   (a) positioning a plurality of spaced-apart substantially homogenous vanadium intermediates adjacent to one surface of a ferrous substrate;
   (b) then welding a homogenous titanium intermediate to each of the vanadium intermediates, and welding each said vanadium intermediate to said ferrous substrate;
   (c) then welding a titanium sheet having a thickness of less than about 2 millimeters to the titanium intermediates.

* * * * *